United States Patent
Yang et al.

(10) Patent No.: US 10,505,401 B2
(45) Date of Patent: Dec. 10, 2019

(54) WIRELESS CHARGING SYSTEM WITH RECEIVER LOCATING CIRCUITRY AND FOREIGN OBJECT DETECTION

(71) Applicant: Apple Inc., Cupertino, CA (US)

(72) Inventors: Heng Yang, Marietta, GA (US); Weihong Qiu, San Ramon, CA (US); Zaki Moussaoui, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 157 days.

(21) Appl. No.: 15/690,121

(22) Filed: Aug. 29, 2017

(65) Prior Publication Data

US 2018/0219421 A1    Aug. 2, 2018

Related U.S. Application Data

(60) Provisional application No. 62/453,859, filed on Feb. 2, 2017, provisional application No. 62/457,743, filed on Feb. 10, 2017.

(51) Int. Cl.
  *H02J 50/12* (2016.01)
  *H02J 50/60* (2016.01)
  *H02J 7/02* (2016.01)

(52) U.S. Cl.
  CPC .............. *H02J 50/12* (2016.02); *H02J 50/60* (2016.02); *H02J 7/025* (2013.01)

(58) Field of Classification Search
  CPC .. H02J 50/12; H02J 50/60; H02J 7/025; H02J 50/00
  USPC .......................................................... 307/104
  See application file for complete search history.

(56) References Cited

U.S. PATENT DOCUMENTS

| | | | | |
|---|---|---|---|---|
| 9,209,627 | B2 * | 12/2015 | Baarman | H01F 17/0013 |
| 9,276,414 | B2 | 3/2016 | Park et al. | |
| 2012/0007437 | A1 * | 1/2012 | Fells | H01F 38/14 |
| | | | | 307/104 |
| 2014/0001881 | A1 * | 1/2014 | Murakami | H02J 5/005 |
| | | | | 307/104 |
| 2014/0094116 | A1 * | 4/2014 | Walley | H02J 7/0004 |
| | | | | 455/41.1 |
| 2014/0300196 | A1 * | 10/2014 | Bunsen | H02J 7/025 |
| | | | | 307/104 |

(Continued)

FOREIGN PATENT DOCUMENTS

EP    3124313 A1    2/2017

*Primary Examiner* — Hal Kaplan
*Assistant Examiner* — Joseph N Inge
(74) *Attorney, Agent, or Firm* — Treyz Law Group, P.C.; G. Victor Treyz; Joseph F. Guihan

(57) ABSTRACT

A wireless power transmission system has a wireless power receiving device that is located on a charging surface of a wireless power transmitting device. The wireless power receiving device has a wireless power receiving coil and the wireless power transmitting device has a wireless power transmitting coil array. Control circuitry in the transmitting device uses inverter circuitry to supply alternating-current signals to coils in the coil array, thereby transmitting wireless power signals. Impulse response measurement circuitry coupled to the coil array is used to make impulse response measurements while the control circuitry uses the inverter circuitry to apply impulse signals to each of the coils. The control circuitry analyzes output from the impulse response measurement circuitry to measure inductances associated with the coils in the coil array.

19 Claims, 14 Drawing Sheets

(56) References Cited

U.S. PATENT DOCUMENTS

| | | | |
|---|---|---|---|
| 2015/0204949 A1* | 7/2015 | Von Novak, III | G01R 33/02 324/258 |
| 2015/0236526 A1* | 8/2015 | Jadidian | H02J 5/005 320/108 |
| 2015/0349543 A1* | 12/2015 | Sakata | H02J 50/12 307/104 |
| 2016/0043566 A1* | 2/2016 | Terao | H02J 7/025 307/104 |
| 2016/0111894 A1 | 4/2016 | Bishtein et al. | |
| 2016/0261137 A1 | 9/2016 | Riehl | |
| 2016/0336730 A1 | 11/2016 | Yamamoto et al. | |
| 2016/0336760 A1* | 11/2016 | Yamamoto | H02J 50/10 |
| 2017/0033615 A1* | 2/2017 | Asanuma | H02J 5/005 |

\* cited by examiner

| Affected TX coils | L2 | L3 | L7 | L8 |
|---|---|---|---|---|
| Stored value | 3.4uH | 3.5uH | 3.3uH | 3.6uH |
| Measured value | 3.4uH | 3.5uH | 3.3uH | 3.6uH |
*FIG. 14*
| Affected TX coils | L2 | L3 | L7 | L8 |
|---|---|---|---|---|
| Stored value | 3.4uH | 3.5uH | 3.3uH | 3.6uH |
| Measured value | 3.2uH | 3.4uH | 3.3uH | 3.4uH |
*FIG. 16*
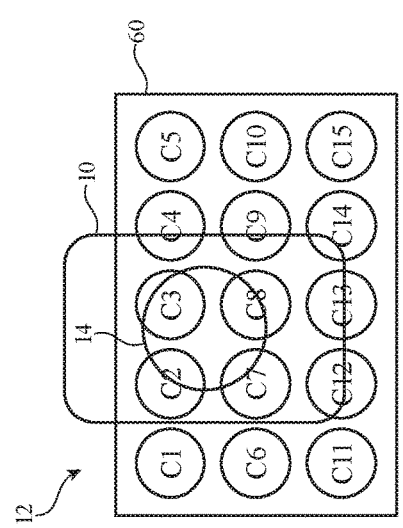
*FIG. 13*
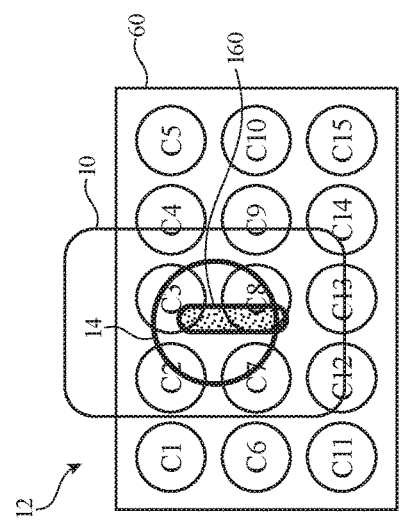
*FIG. 15*

WIRELESS CHARGING SYSTEM WITH RECEIVER LOCATING CIRCUITRY AND FOREIGN OBJECT DETECTION

This application claims priority to U.S. provisional patent application No. 62/453,859, filed on Feb. 2, 2017, and provisional patent application No. 62/457,743, filed on Feb. 10, 2017, which are hereby incorporated by reference herein in their entireties.

FIELD

This relates generally to wireless systems, and, more particularly, to systems in which devices are wirelessly charged.

BACKGROUND

In a wireless charging system, a wireless power transmitting device such as a device with a charging surface wirelessly transmits power to a portable electronic device. The portable electronic device receives the wirelessly transmitted power and uses this power to charge an internal battery and to power components in the portable electronic device.

It can be challenging to regulate the flow of wireless power in a wireless charging system. For example, in a wireless charging system having a wireless charging surface with an array of wireless power transmitting coils, it can be difficult to determine which coils to use to effectively transmit wireless power to a portable electronic device. It can also be difficult to detect the presence of foreign objects on the wireless charging surface.

SUMMARY

A wireless power transmission system has a wireless power receiving device that is located on a charging surface of a wireless power transmitting device. The wireless power receiving device has a wireless power receiving coil and the wireless power transmitting device has a wireless power transmitting coil array. Control circuitry may use inverter circuitry in the wireless power transmitting device to supply alternating-current signals to coils in the coil array, thereby transmitting wireless power signals.

Impulse response measurement circuitry coupled to the coil array may make impulse response measurements while the control circuitry uses the inverter circuitry to apply impulse signals to each of the coils. The control circuitry can analyze measurements made with the impulse response measurement circuitry to determine the values of inductances associated with the coils in the coil array.

By using processing techniques such as expression-based and look-up-table-based non-linear interpolation techniques, the control circuitry can determine the location of the wireless power receiving coil relative to the coils of the coil array. This information and additional information associated with the measured inductances of the coils in the wireless power transmitting device can be used in taking actions such as making wireless power transmission adjustments, adjusting the display of information on a display in the wireless power transmitting device, and setting maximum transmit power levels.

Foreign objects on the coil array such as foreign objects that are overlapped by a wireless power receiving coil in a wireless power receiving device can be detected by comparing measured inductance values to sets of coil inductances that are known to be associated with the presence of a power receiving device in the absence of foreign objects. In response to detecting that a foreign object is present, wireless power transmission operations can be blocked or other suitable action can be taken.

BRIEF DESCRIPTION OF THE DRAWINGS

FIG. 13 is a diagram of an illustrative coil array with fifteen coils that is being overlapped by a wireless receiving device in accordance with an embodiment.

FIG. 14 is a table showing how measured inductance values for the coils in the coil array (e.g., inductance values that vary from a nominal coil inductance) match a predetermined valid set of coil inductance values in accordance with an embodiment.

FIG. 15 is a diagram of an illustrative coil array with fifteen coils that is being overlapped by a wireless receiving device and a foreign object in accordance with an embodiment.

FIG. 16 is a table showing how measured inductance values for the coils in the coil array of FIG. 15 do not match any predetermined valid set of measured inductance values indicating that the foreign object of FIG. 15 is present on the coil array in accordance with an embodiment.

DETAILED DESCRIPTION

Figure 1:
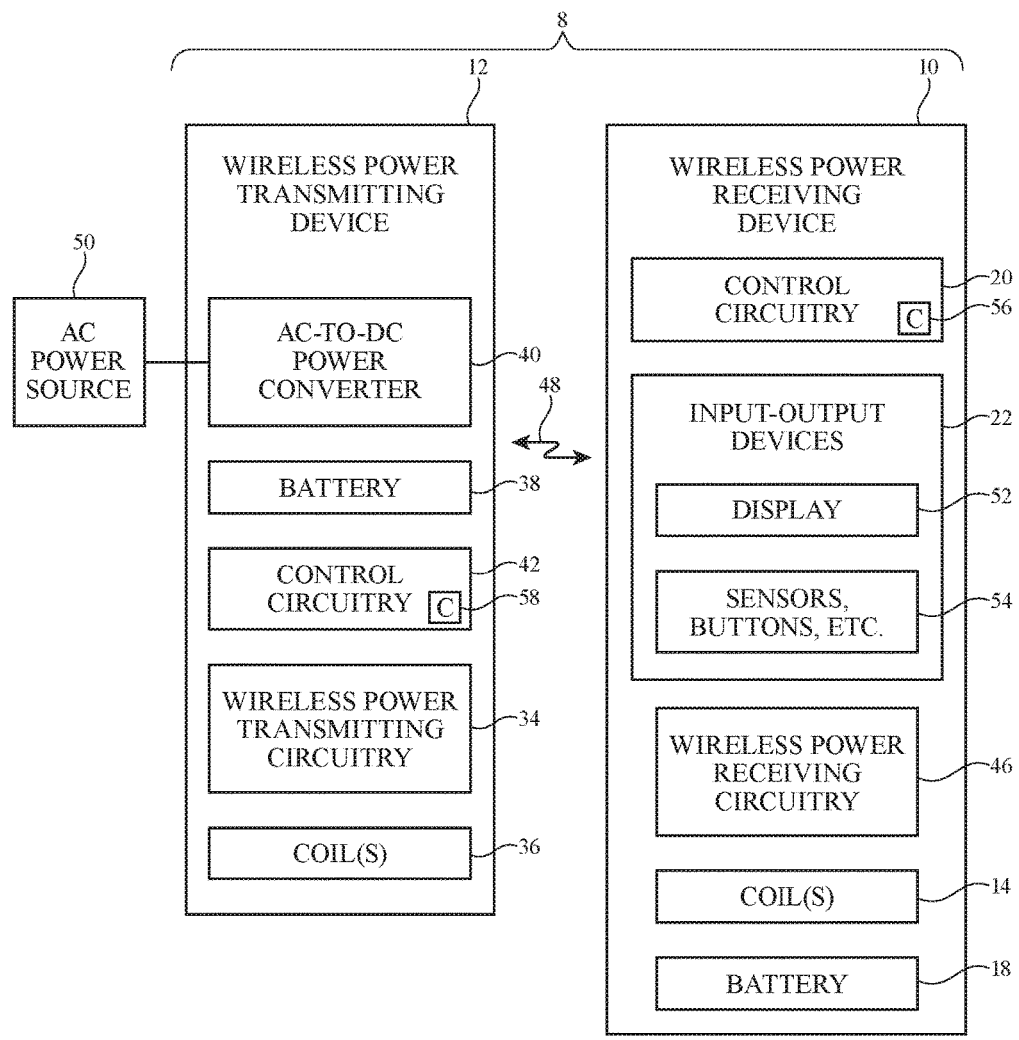
FIG. 1 is a schematic diagram of an illustrative wireless charging system in accordance with embodiments.

A wireless power system has a wireless power transmitting device that transmits power wirelessly to a wireless power receiving device. The wireless power transmitting device is a device such as a wireless charging mat, wireless charging puck, wireless charging stand, wireless charging table, or other wireless power transmitting equipment. The wireless power transmitting device has one or more coils that are used in transmitting wireless power to one or more wireless power receiving coils in the wireless power receiving device. The wireless power receiving device is a device such as a cellular telephone, watch, media player, tablet computer, pair of earbuds, remote control, laptop computer, other portable electronic device, or other wireless power receiving equipment.

During operation, the wireless power transmitting device supplies alternating-current drive signals to one or more wireless power transmitting coils. This causes the coils to transmit alternating-current electromagnetic signals (sometimes referred to as wireless power signals) to one or more corresponding coils in the wireless power receiving device. Rectifier circuitry in the wireless power receiving device converts received wireless power signals into direct-current (DC) power for powering the wireless power receiving device.

The position at which a wireless power receiving device is located on a wireless charging surface affects electromagnetic coupling (coupling coefficient k) between the coil(s) in the wireless power receiving device and each of the coils in the charging surface. The inductance of each transmitting coil may also be affected by the placement of the wireless power receiving device on the charging surface. For example, the inductance of a particular wireless power transmitting coil will increase when a wireless power receiving coil and the corresponding ferrite or other magnetic material in that coil overlaps the power transmitting coil. By making inductance measurements on the array of wireless power transmitting coils in a wireless power transmitting device, the location of one or more wireless power receiving coils relative to each of the wireless power transmitting coils can be determined. Information on the size and orientation of the wireless power receiving device may also be determined. Based on the inductance measurements and other information, the settings of wireless power transmitting circuitry in the wireless power transmitting device may be adjusted to help enhance wireless power transfer operations. If desired, one or more coils in a wireless power transmitting device may be driven with appropriate weight(s), wireless power transmission limits may be established, content may be displayed on a display, and other actions may be taken. In some situations, incompatible objects such as coins or other foreign objects may be present in the vicinity of a wireless power receiving device. For example, a wireless power receiving device coil may overlap a foreign object. By comparing measured inductance values to predetermined valid sets of coil inductances, the presence of a foreign object may be detected so that wireless power transmission operations may be blocked or other suitable action taken.

An illustrative wireless power system (wireless charging system) is shown in FIG. 1. As shown in FIG. 1, wireless power system 8 includes wireless power transmitting device 12 and one or more wireless power receiving devices such as wireless power receiving device 10. Device 12 may be a stand-alone device such as a wireless charging mat, may be built into furniture, or may be other wireless charging equipment. Device 10 is a portable electronic device such as a wristwatch, a cellular telephone, a tablet computer, or other electronic equipment. Illustrative configurations in which device 12 is a mat or other equipment that forms a wireless charging surface and in which device 10 is a portable electronic device that rests on the wireless charging surface during wireless power transfer operations are sometimes be described herein as examples.

During operation of system 8, a user places one or more devices 10 on the charging surface of device 12. Power transmitting device 12 is coupled to a source of alternating-current voltage such as alternating-current power source 50 (e.g., a wall outlet that supplies line power or other source of mains electricity), has a battery such as battery 38 for supplying power, and/or is coupled to another source of power. A power converter such as alternating-current-to-direct current (AC-DC) power converter 40 can convert power from a mains power source or other alternating-current (AC) power source into direct-current (DC) power that is used to power control circuitry 42 and other circuitry in device 12. During operation, control circuitry 42 uses wireless power transmitting circuitry 34 and one or more coil(s) 36 coupled to circuitry 34 to transmit alternating-current electromagnetic signals 48 to device 10 and thereby convey wireless power to wireless power receiving circuitry 46 of device 10.

Power transmitting circuitry 34 has switching circuitry (inverter circuitry) that supplies AC signals (drive signals) to one or more of coils 36 during wireless power transfer operations. One or more coils 36 may be used at a time for wireless power transfer. For example, a single coil 36 may supply power to a single receiving device that overlaps that coil, two coils 36 (e.g., adjacent coils) may supply power to a single device overlapping those two coils or to a pair of devices overlapping those coils, three or more coils may be driven to supply power to a single overlapping receiving device or to multiple overlapping receiving devices, two or more coils or three or more coils that are not adjacent to each other may be driven simultaneously to supply power to two or more or three or more devices at different respective locations on the coil array, etc.

The inverter circuitry that supplies the drive signals to coils 36 may include a single pair of transistors or other inverter circuit coupled to multiple coils 36 through multiplexer circuitry (e.g., to allow those transistors to be shared between multiple coils), may include a pair of transistors or other inverter circuit associated with each coil, and/or may include other inverter circuit arrangements that allow alternating-current drive signals to be supplied to one or more selected coils 36.

During power transfer operations, transistors in the inverter circuitry are turned on and off based on control signals provided by control circuitry 42. In configurations in which multiple coils have multiple respective inverter circuits, the transistors in the active coils (coils selected for wireless power transfer) may be turned on and off without turning on and off the transistors in the inactive coils. In configurations in which multiplexing circuitry is used to couple the inverter circuitry to selected coils, the multiplexing circuitry is configured appropriately to route AC signals from the inverter circuitry to the selected coils. As the AC signals pass through one or more coils 36 that have been selected for supplying wireless power, alternating-current electromagnetic fields (wireless power signals 48) are produced that are received by corresponding coil(s) 14 coupled to wireless power receiving circuitry 46 in receiving device 10. When the alternating-current electromagnetic fields are received by coil 14, corresponding alternating-current currents and voltages are induced in coil 14. Rectifier circuitry in circuitry 46 converts received AC signals (received alternating-current currents and voltages associated with wireless power signals) from coil(s) 14 into DC voltage signals for powering device 10. The DC voltages are used in powering components in device 10 such as display 52, touch sensor components and other sensors 54 (e.g., accelerometers, force sensors, temperature sensors, light sensors, pressure sensors, gas sensors, moisture sensors, magnetic sensors, etc.), wireless communications circuits 56 for communicating wirelessly with corresponding wireless communications circuitry 58 in control circuitry 42 of wireless power transmitting device 12 and/or other equipment, audio components, and other components (e.g., input-output devices 22 and/or control circuitry 20) and are used in charging an internal battery in device 10 such as battery 18.

Devices 12 and 10 include control circuitry 42 and 20. Control circuitry 42 and 20 includes storage and processing circuitry such as microprocessors, power management units, baseband processors, digital signal processors, microcontrollers, and/or application-specific integrated circuits with processing circuits. Control circuitry 42 and 20 is configured to execute instructions for implementing desired control and communications features in system 8. For example, control circuitry 42 and/or 20 may be used in determining power transmission levels, processing sensor data, processing user input, processing other information such as information on wireless coupling efficiency from transmitting circuitry 34, processing information from receiving circuitry 46, using sensing circuitry to measure coil inductances and other parameters, processing measured inductance values, using information from circuitry 34 and/or 46 such as signal measurements on output circuitry in circuitry 34 and other information from circuitry 34 and/or 46 to determine when to start and stop wireless charging operations, adjusting charging parameters such as charging frequencies, coil settings (e.g., which coils are active and weights for active coils) in a multi-coil array, and wireless power transmission levels, and performing other control functions. Control circuitry 42 and 20 may be configured to support wireless communications between devices 12 and 10 (e.g., control circuitry 20 may include wireless communications circuitry such as circuitry 56 and control circuitry 42 may include wireless communications circuitry such as circuitry 58). Control circuitry 42 and/or 20 may be configured to perform these operations using hardware (e.g., dedicated hardware or circuitry) and/or software (e.g., code that runs on the hardware of system 8). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

Device 12 and/or device 10 may communicate wirelessly during operation of system 8. Devices 10 and 12 may, for example, have wireless transceiver circuitry in control circuitry 20 and 42 (see, e.g., wireless communications circuitry such as circuitry 56 and 58 of FIG. 1) that allows wireless transmission of signals between devices 10 and 12 (e.g., using antennas that are separate from coils 36 and 14 to transmit and receive unidirectional or bidirectional wireless signals, using coils 36 and 14 to transmit and receive unidirectional or bidirectional wireless signals, etc.).

Figure 2:
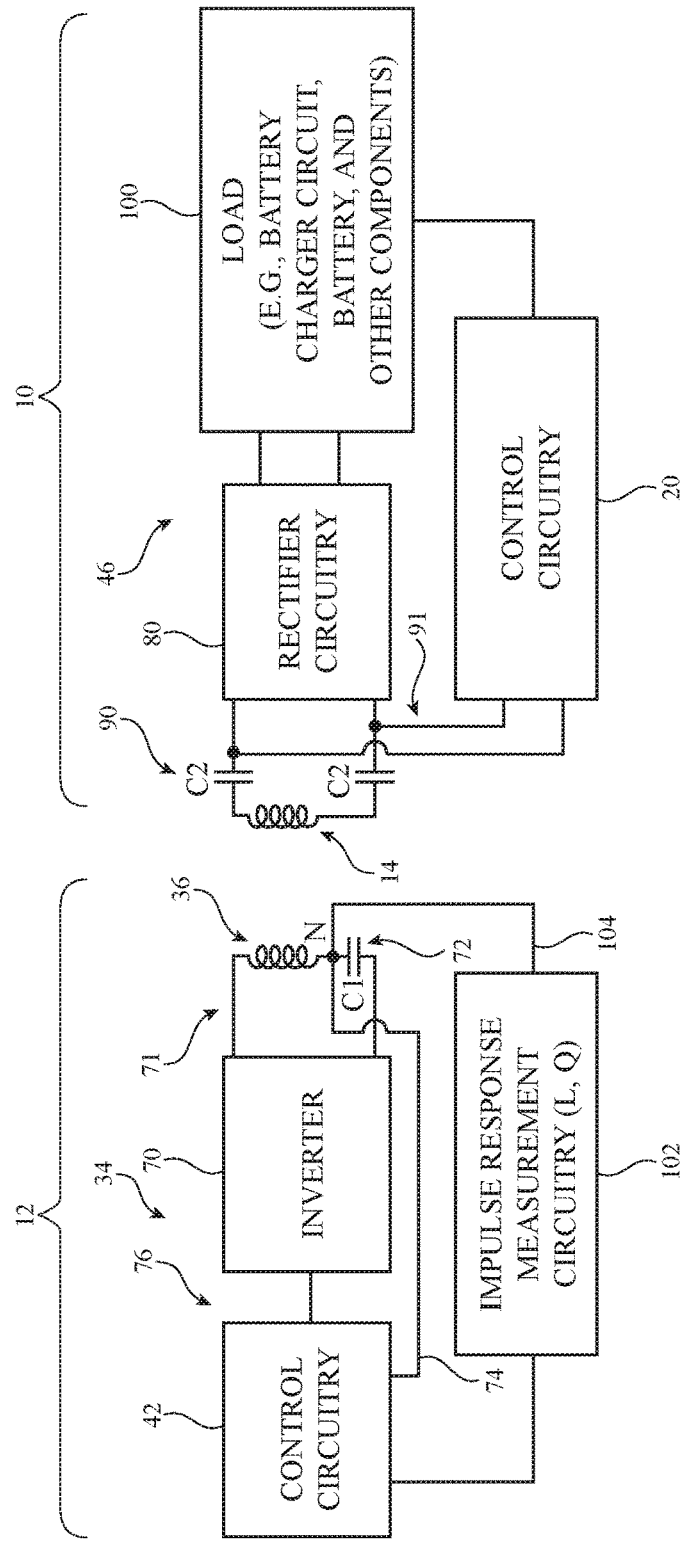
FIG. 2 is a circuit diagram of an illustrative wireless charging system in accordance with an embodiment.

A circuit diagram of illustrative circuitry for wireless power transfer (wireless power charging) system 8 is shown in FIG. 2. As shown in FIG. 2, wireless power transmitting circuitry 34 includes an inverter such as inverter 70 or other drive circuit that produces alternating-current drive signals such as variable-duty-cycle square waves or other drive signals. These signals are driven through an output circuit such as output circuit 71 that includes coil(s) 36 and capacitor(s) 72 to produce wireless power signals that are transmitted wirelessly to device 10.

Coil(s) 36 are electromagnetically coupled with coil(s) 14. A single coil 36 and single corresponding coil 14 are shown in the example of FIG. 2. In general, device 12 may have any suitable number of coils (1-100, more than 5, more than 10, fewer than 40, fewer than 30, 5-25, etc.) and device 10 may have any suitable number of coils. Switching circuitry (sometimes referred to as multiplexer circuitry) that is controlled by control circuitry 42 can be located before and/or after each coil (e.g., before and/or after each coil 36 and/or before and/or after the other components of output circuit 71 in device 12) to couple the array of coils to inverter 70 and can be used to switch desired sets of one or more coils (e.g., coils 36 and output circuits 71 in device 12) into or out of use. For example, if it is determined that device 10 is located in a position that overlaps a particular coil 36 in device 12, the coil 36 overlapping device 10 may be activated during wireless power transmission operations while other coils 36 (e.g., coils not overlapped by device 10 in this example) are turned off.

Control circuitry 42 and control circuitry 20 contain wireless transceiver circuits (e.g., circuits such as wireless communication circuitry 56 and 58 of FIG. 1) for supporting wireless data transmission between devices 12 and 10. In device 10, control circuitry 20 (e.g., communications circuitry 56) can use path 91 and coil 14 to transmit data to device 12. In device 12, paths such as path 74 may be used to supply incoming data signals that have been received from device 10 using coil 36 to demodulating (receiver) circuitry in communications circuitry 58 of control circuitry 42. If desired, path 74 may be used in transmitting wireless data to device 10 with coil 36 that is received by receiver circuitry in circuitry 56 of circuitry 20 using coil 14 and path 91. Configurations in which circuitry 56 of circuitry 20 and circuitry 58 of circuitry 42 have antennas that are separate from coils 36 and 14 may also be used for supporting unidirectional and/or bidirectional wireless communications between devices 12 and 10, if desired.

During wireless power transmission operations, transistors in inverter 70 are controlled using AC control signals from control circuitry 42. Control circuitry 42 uses control path 76 to supply control signals to the gates of the transistors in inverter 70. The duty cycle and/or other attributes of these control signals and therefore the corresponding characteristics of the drive signals applied by inverter 70 to coil 36 and the corresponding wireless power signals produced by coil 36 can be adjusted dynamically. Using switching circuitry, control circuitry 42 selects which coil or coils to supply with drive signals. Using duty cycle adjustments and/or other adjustments (e.g., drive frequency adjustments, etc.), control circuitry 42 can adjust the strength of the drive signals applied to each coil. A single selected coil may be used in transmitting power wirelessly from device 12 to device 10 or multiple coils 36 may be used in transmitting power. One or more devices 10 may receive wireless power and each of these devices may have one or more wireless power receiving coils that receive power from one or more corresponding wireless power transmitting coils.

Wireless power receiving device 10 has wireless power receiving circuitry 46. Circuitry 46 includes rectifier circuitry such as rectifier 80 (e.g., a synchronous rectifier controlled by signals from control circuitry 20) that converts received alternating-current signals from coil 14 (e.g., wireless power signals received by coil 14) into direct-current (DC) power signals for powering circuitry in device 10 such as load 100. Load circuitry such as load 100 may include battery 18, a power circuit such as a battery charging integrated circuit or other power management integrated circuit(s) that receives power from rectifier circuitry 80 and regulates the flow of this power to battery 18, and/or other input-output devices 22. One or more capacitors C2 are used to couple coil 14 in input circuit 90 of device 10 to input terminals for rectifier circuitry 80. Rectifier circuitry 80 produces corresponding output power at output terminals that are coupled to load 100. If desired, load 100 may include sensor circuitry (e.g., current and voltage sensors) for monitoring the flow of power to load 100 from rectifier 80.

The inductance L of each wireless power transmitting coil 36 in device 12 can be affected (e.g., increased) by the presence of overlapping coil(s) 14 and associated magnetic material (e.g., ferrite core material, etc.) in device 10. The location(s) of coil(s) 14 can therefore be determined by making inductance measurements on each of coils 36 and processing these measurements (e.g., using interpolation techniques, etc.). In situations in which a metal coin or other foreign object is present on the coil array (e.g., under coil 14 or elsewhere on the coil array), the presence of the foreign object may be detected by comparing the measured inductances of coils 36 to predetermined valid sets of coil inductances. If a match between a set of measured inductances and valid set of previously measured inductances is detected, it can be concluded that only device 10 is present and that no foreign objects are present, so wireless power transmission operations may be performed. If no match is detected, it can be concluded that a foreign object is likely to be present and wireless power transmission operations may be blocked (e.g., no wireless power transmission operations may be performed) or other suitable action may be taken (e.g., a visual alert may be issued for a user using a light-emitting component such as a status indicator light-emitting diode, a display, etc., an audible alert may be issued using a sound-emitting component such as a tone generator or speaker, a haptic alert may be issued using a haptic device such as a vibrator), and/or other actions may be taken.

During wireless power transmission operations, transistors in inverter 70 are driven by AC control signals from control circuitry 42. Control circuitry 42 may also use inverter 70 to apply square wave impulse pulses or other impulses to each coil 36 during impulse response measurements. Impulse response measurement circuitry 102 is coupled to output circuit 71. For example, circuitry 102 may be coupled to node N in output circuit 102 using path 104. Control circuitry 42 uses impulse response measurement circuitry 102 to make measurements on output circuit 71 (e.g., measurements on the inductance L of coil 36, measurements of quality factor Q, etc.).

Each coil 36 in device 12 (e.g., a coil such as coil 36 of FIG. 2 that has been selected by control circuitry 42 using multiplexing circuitry in wireless transmitter circuitry 34) has an inductance L. One or more capacitors in output circuit 71 such as capacitor 72 exhibit a capacitance C1 that is coupled in series with inductance L in output circuit 71. When supplied with alternating-current drive signals from inverter 70, the output circuit formed from coil 36 and capacitor 72 will produce alternating-current electromagnetic fields that are received by coil(s) 14 in device 10. The inductance L of each coil 36 is influenced by magnetic coupling with external objects, so measurements of inductance L for each coil 36 in device 12 can reveal information on device(s) 10 on the charging surface of device 12.

During impulse response measurements, circuitry 42 uses impulse response measurement circuitry 102 (sometimes referred to as inductance measurement circuitry and/or Q factor measurement circuitry) to perform measurements of inductance L and quality factor Q. Impedance measurements and other measurements with circuitry 102 may be initiated in response to detection of an external object on device 12 using a foreign object detection sensor (e.g., a sensor using coils 36 and/or other coils, a sensor using light-based sensing, capacitive based sensing, or other sensing techniques, etc.). Impedance measurements and other measurements with circuitry 102 may also be initiated in response to manual input, based on wirelessly received commands, etc. During the measurements, control circuitry 42 directs inverter 70 to supply one or more excitation pulses (impulses) to each coil 36, so that the inductance L and capacitance C1 of the capacitor 72 in the output circuit 71 that includes that coil 36 form a resonant circuit. The impulses may be, for example, square wave pulses of 1 µs in duration. Longer or shorter pulses and/or pulses of other shapes may be applied, if desired. The resonant circuit resonates at a frequency near to the normal wireless charging frequency of coil 36 (e.g., about 120 kHz, 50-300 kHz, about 240 kHz, 100-500 kHz, more than 75 kHz, less than 400 kHz, or other suitable wireless charging frequency) or may resonate at other frequencies.

Figure 3:
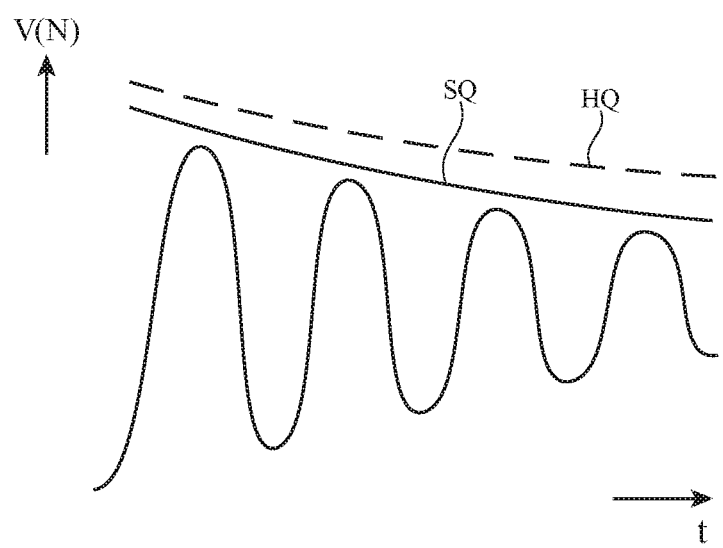
FIG. 3 is a graph of an illustrative impulse response to an applied impulse signal in a wireless charging system in accordance with an embodiment.

The impulse response (e.g., the voltage V(N) at node N of circuit 71) to the applied pulse(s) is as shown in FIG. 3. The frequency of the impulse response signal of FIG. 3 is proportional to $1/\sqrt{LC1}$, so L can be obtained from the known value of C1 and the measured frequency of the impulse response signal. Q may be derived from L and the measured decay of the impulse response signal. As shown in FIG. 3, if signal V(N) decays slowly, Q is high (e.g., HQ) and if signal V(N) decays more rapidly, Q is low (e.g., SQ). Measurement of the decay envelope of V(N) and frequency of V(N) of the impulse response signal of FIG. 3 with circuitry 102 will therefore allow control circuitry 42 to determine Q and L.

Figure 4:
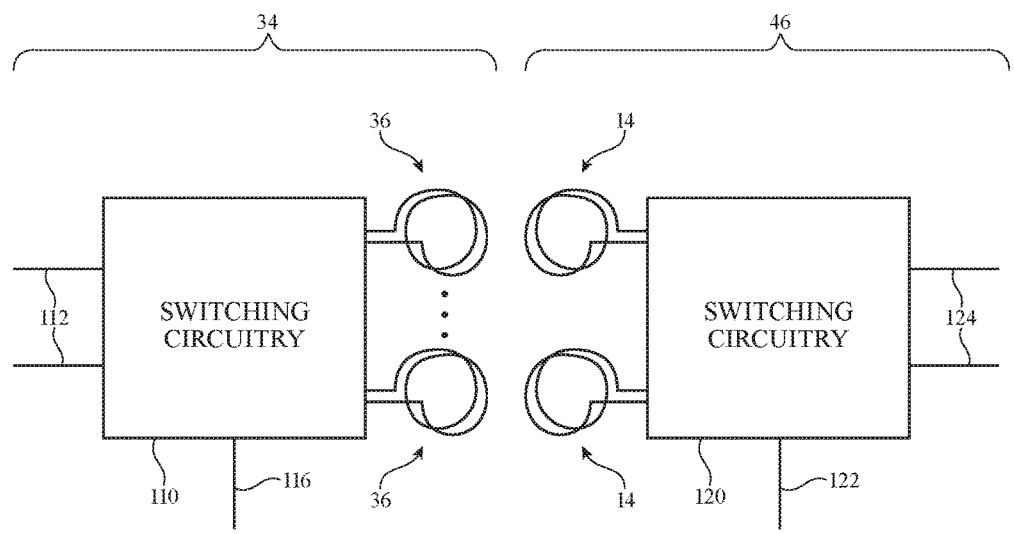
FIG. 4 is a diagram of illustrative wireless power transmitting and wireless power receiving circuitry in accordance with an embodiment.

FIG. 4 shows how wireless power transmitting circuitry 34 includes switching circuitry 110. Signals from inverter circuitry 70 are applied to switching circuitry 110 at input 112. Switching circuitry 110 forms part of wireless power transmitting circuitry 34 (sometimes referred to as inverter circuitry). Control signals applied to control input 116 by control circuitry 42 direct switching circuitry 110 to route the signals from input 112 to a selected one of coils 36 in an array of coils 36 in device 12. Wireless power receiving circuitry 46 of device 10 includes one or more coils 14. In configurations for device 10 that include multiple coils 14, coils 14 are coupled to switching circuitry 120. Control circuitry 20 applies control signals to control input 122 that direct switching circuitry 120 to route signals from a selected one of coils 14 to rectifier 80 via output terminals 124.

Figure 5:
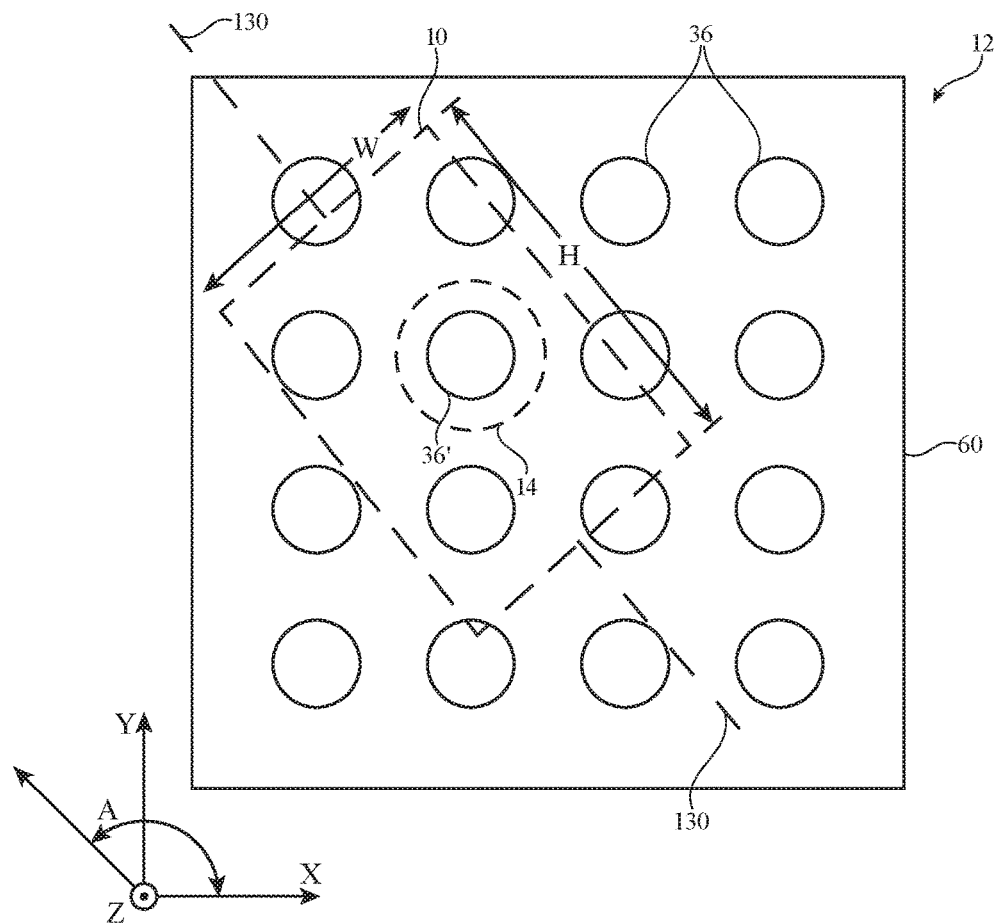
FIG. 5 is a top view of an illustrative wireless power transmitting device with an array of coils that forms a wireless charging surface in accordance with an embodiment.

With one illustrative configuration for wireless transmitting device 12, wireless transmitting device 12 is a wireless charging mat or other wireless power transmitting equipment that has an array of coils 36 that supply wireless power over a wireless charging surface. This type of arrangement is shown in FIG. 5. In the example of FIG. 5, device 12 has an array of coils 36 that lie in the X-Y plane. Coils 36 of device 12 are covered by a planar dielectric structure such as a plastic member or other structure forming charging surface 60. The lateral dimensions (X and Y dimensions) of the array of coils 36 in device 36 may be 1-1000 cm, 5-50 cm, more than 5 cm, more than 20 cm, less than 200 cm, less than 75 cm, or other suitable size. Coils 36 may overlap or may be arranged in a non-overlapping configuration. Coils 36 can be placed in a rectangular array having rows and columns and/or may be tiled using a hexagonal tile pattern, a pattern with square tiles, or other pattern.

When a user places device 10 on charging surface 60, coil 14 (or multiple coils 14 in configurations in which device 10 contains multiple coils) will overlap one or more coils 36. In the example of FIG. 5, coil 14 of device 10 is overlapping coil 36' (e.g., the center of coil 14 is aligned with the center of coil 36'). Device 10 in the example of FIG. 5 has a rectangular footprint (outline when viewed from above) and is characterized by longitudinal axis 130. Axis 130 is aligned at an angle A with respect to horizontal axis X in FIG. 5 (e.g., an angle of 0-360°). Knowledge of the location of the center of coil 14 and the value of angle A (the angular orientation of device 10 relative to device 12) can be used to adjust charging system parameters (e.g., to make transmitting coil selections, to adjust maximum transmit powers, and/or to adjust other system settings).

Control circuitry 42 uses impedance measurement circuitry such as impulse response measurement circuitry 102 and switching circuitry 110 to measure L for each of coils 36 under charging surface 60. If the measured value of L for a given coil matches the normal (nominal) L value expected for each of coils 36 in the array of coils 36 overlapping surface 60 (e.g., when the measured L value is not influenced by the presence of coil 14 or other portions of device 10), control circuitry 42 can conclude that no external object is present. If a given measured value of L is different than the nominal value of L, control circuitry 42 can conclude that a portion of the housing of device 10 is present (e.g., if a decrease in L has been measured) or that coil 14 is present (e.g., if an increase in L has been measured). The locations and L values of each measured coil 36 can be analyzed by control circuitry 42 to help detect which type of device 10 is present (e.g., impedance-change patterns can be used to help identify a watch or other small device, a cellular telephone, a tablet computer, etc.), to determine the location (center of coil 14 and/or center of device 10) of device 12, and to determine the angular orientation A of device 12.

Figure 6:
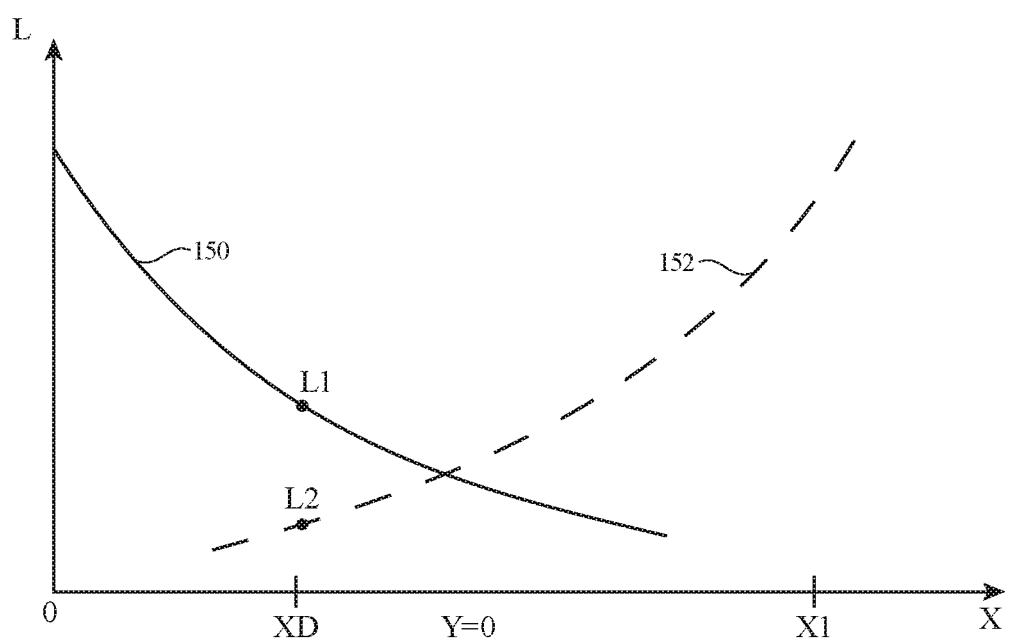
FIG. 6 is a graph showing illustrative inductances produced in first and second wireless power transmitting coils in a wireless power transmitting device as a function of wireless power receiving device coil location in accordance with an embodiment.

FIG. 6 is a graph showing how measured inductance L varies as a function of the position of coil 14 on charging surface 60. In the example of FIG. 6, a first of coils 36 is located at position (X,Y)=(0,0) and a second of coils 36 is located at position (X,Y)=(X1, 0). Curve 150 shows how the inductance of the first coil is highest when coil 14 is aligned with the first coil 36 and decreases as coil 14 is located at increasing distances X from the first coil. Curve 152 shows how the inductance of the second coil is highest when coil 14 is aligned with the second coil and decreases as coil 14 is located at increasing distances from the second coil (e.g., decreasing values of X). Curves 150 and 152 represent the non-linear relationships between L and receiver coil position relative to transmitter coil position. These non-linear relationships may be stored in device 12 using non-linear equations (e.g., non-linear expressions such as curve-fit nth-order polynomials where n is 2-7, more than 3, more than 2, less than 5, or other suitable value) and/or numerical look-up table entries. During non-linear interpolation operations, control circuitry 42 measures the inductance of the first and second coils and uses these inductance measurements to determine the locations of coil 14. In the example of FIG. 6, the measured inductance of the first coil is L1 and the measured inductance of the second coil is L2. Control circuitry 42 uses interpolation (e.g., expression-based non-linear interpolation or look-up-table-based non-linear interpolation) to determine coil position XD (e.g., the position of coil 14 relative to the first and second coils 36) from the measured values of L1 and L2.

In the FIG. 6 example, device 10 has a coil 14 that partly overlaps two coils 36. If desired, interpolation techniques may be used to determine the position of coil 14 (X,Y) on charging surface 60 from more than two coil inductance measurements. For example, the position of coil 14 can be determined by measuring the changes in inductance of three of coils 36 that are affected by the presence of coil 14, as illustrated in FIG. 7.

Figure 7:
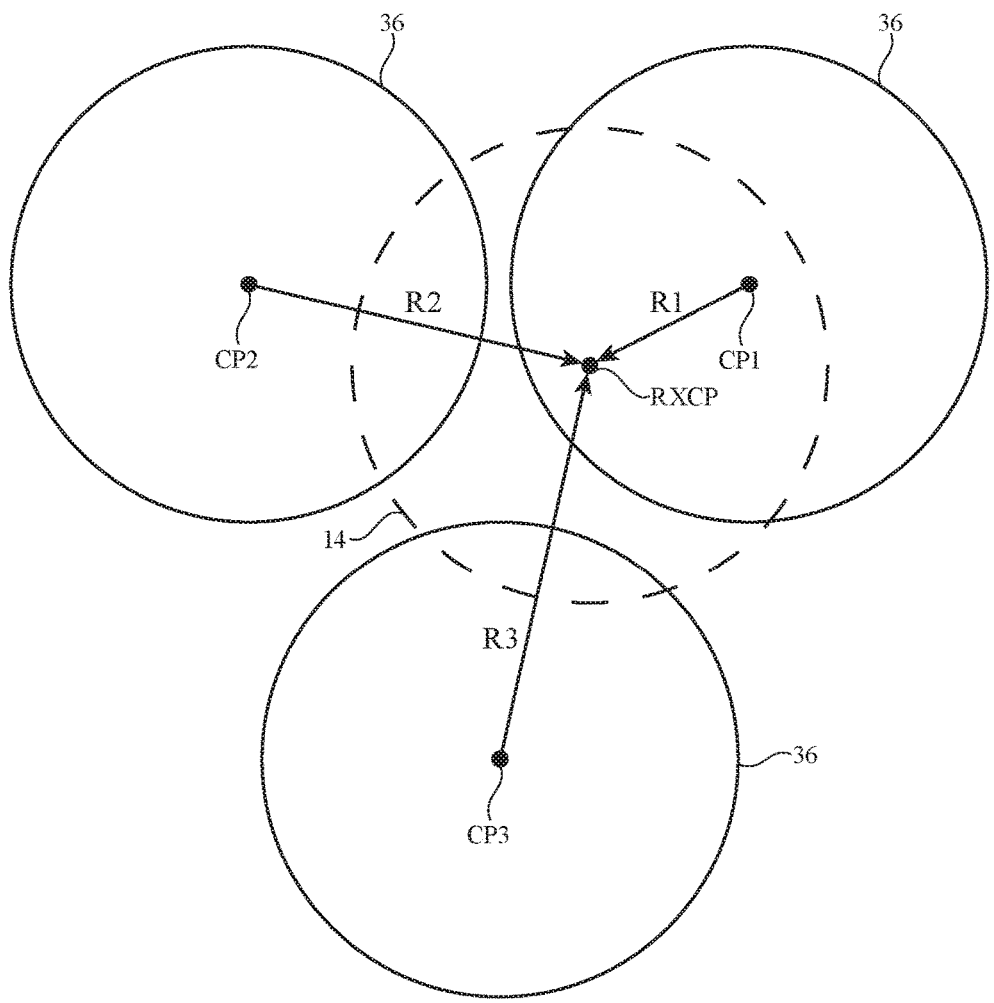
FIG. 7 is a diagram showing how inductance measurements from a set of wireless power transmitting coils can be used to determine the location of a wireless power receiving coil that overlaps a wireless charging surface in accordance with an embodiment.

In the configuration of FIG. 7, a first of wireless power transmitting coils 36 has center point CP1, a second of wireless power transmitting coils 36 has center point CP2, and a third of wireless power transmitting coils 36 has center point CP3. The center of wireless power receiving coil 14 is located at center point RXCP. The amount of inductance increase due to the overlap of coil 14 and the first of coils 36 is related to the distance R1 between center point CP1 and center point RXCP. The inductance increases experienced by the second and third of coils 36 are likewise correspondingly related to the distance R2 between center points CP2 and RXCP and the distance R3 between center points CP3 and RXCP. By measuring the first, second, and third inductances (L1, L2, and L3) of the first, second, and third coils, and by using control circuitry 42 to apply the non-linear relationships of curves such as illustrative inductance-versus-distance curve 150 of FIG. 6 (e.g., using non-linear curve-fit polynomials or other non-linear expressions, using look-up table entries, etc.), control circuitry 42 can determine the values of R1, R2, and R3 from the measured inductances of the first, second, and third coils 36 in FIG. 7 and can therefore compute the location (in X, Y) of center point RXCP for coil 14. Determining the location of coil 14 relative to coils 36 in this way allows control circuitry 42 to determine the location of device 10 relative to device 14 and the array of coils 36 in charging surface 60.

Inductance measurements can also be made to determine the location and orientation of the housing for device 10 and therefore the value of angular orientation A. For example, device 10 may have a housing formed from metal or other material that tends to lower the measured inductance for transmitting coils 36 that are overlapped by the housing. In scenarios in which the outline of device 10 is rectangular, the array of coils 36 under surface 60 may experience a corresponding rectangular set of inductance decreases. The outline of device 10 can be measured by using control circuitry 42 to recognize a rectangular pattern of lowered L values or other changed L values. By measuring the location of a rectangular set of reduced inductance values (e.g., a pattern of reduced coil inductances that have the shape of a known device 10, which may surround a measured increase in inductance for a particular coil or coils such as the three coils of FIG. 6), the location (X,Y position) and angular orientation (angle A of FIG. 5) may be determined. Information on the location and angular orientation of device 10 can be used by control circuitry 42 to adjust system parameters (e.g., to set maximum charging powers, to select a coil or coils for transmitting wireless power, etc.). Additional actions that may be taken based on inductance measurements, recognized patterns of inductance changes, and other measurements on coils 36 include coordinating the display of information on the display of device 12 (e.g., controlling the angular orientation of on-screen content based on a measured value of angular orientation A), moving displayed information seamlessly between different devices 10 and different locations and orientations on charging surface 60, facilitating communications between devices 10, etc.

Figure 8:
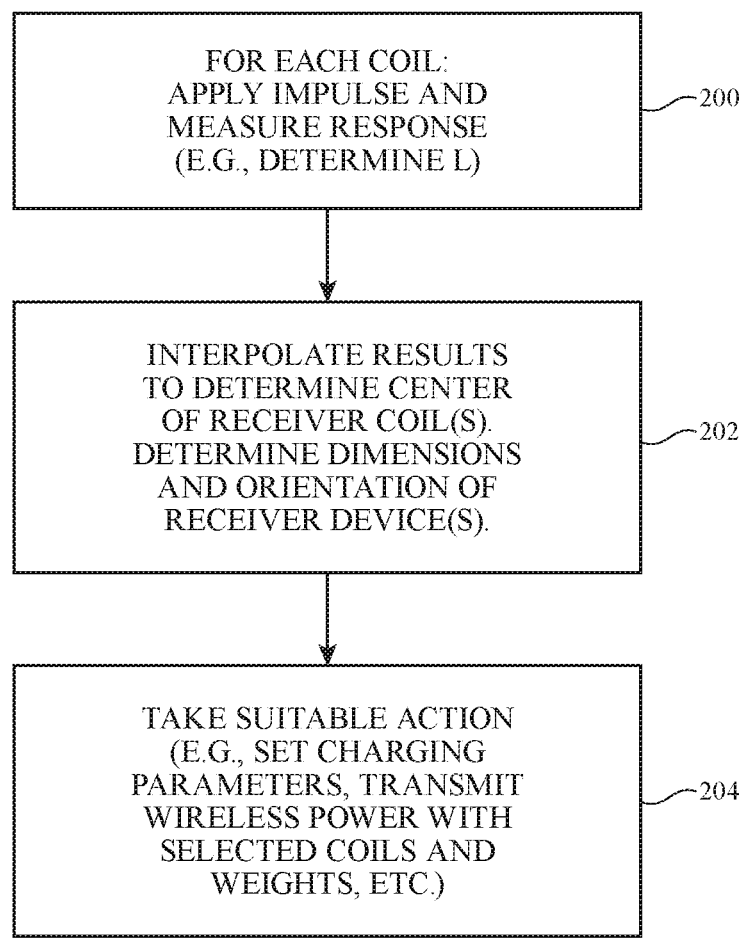
FIG. 8 is a flow chart of illustrative operations involved in operating a wireless power transfer system in accordance with an embodiment.

FIG. 8 is a flow chart of illustrative operations involved in using charging system 8.

During the operations of block 200, control circuitry 42 applies impulses (square wave pulses or other pulses) to output circuit 71 and an associated wireless power transmitting coil 36 in output circuit 71 using inverter 70. This process is performed for each coil 36 in the array of wireless power transmitting coils in wireless charging surface 60. Switching circuitry 110 is adjusted by control circuitry 42 so that each coil 36 is provided with a respective impulse from control circuitry 42. As each impulse is applied to the output circuit associated with a respective coil 36, control circuit 42 uses impulse response measurement circuit 102 to determine parameters such as coil inductance L, resonant frequency, Q-factor, etc. For example, control circuitry 42 can derive inductance L from a measurement of the resonant frequency of the signal measured at node N by circuitry 102 in response to an impulse applied to output circuit 71.

After measuring L and, if desired, other parameters associated with each output circuit 71 and coil 36 in charging surface 60, control circuitry processes these measurements using techniques such as non-linear interpolation. In particular, during the operations of block 202, control circuitry 42 uses non-linear relationships such as the non-linear curves of FIG. 6 to determine the distance of coil 14 from each of multiple coils 36 that have experienced respective inductance increases. The non-linear L-versus-distance relationships of the FIG. 6 curves may be embodied in expressions maintained by control circuitry 42 and/or look-up tables that are maintained by control circuitry 42.

The operations of block 202 may also involve pattern detection operations. If, as an example, the inductances L of a set of coils 36 decrease along a rectangular path, control circuitry 42 can conclude that a wireless power receiving device is present on charging surface 60 that has a matching rectangular outline with a corresponding rectangular metal peripheral housing member. The size of the rectangular outline and the angular orientation of the rectangular outline (e.g., the angular orientation A of device 10 of FIG. 5) may be determined. As another example, control circuitry 42 can detect that a wristwatch or other small device is present. When multiple devices 10 are present, control circuitry 42 detects the coil locations and angular orientations of each device relative to surface 60 and relative to each other.

During the operations of block 204, control circuitry 42 takes actions based on the information gathered during the operations of blocks 200 and 202. For example, if it is determined that a small device with a correspondingly small maximum wireless power capability is present, control circuitry 42 can set a maximum wireless power transmission limit for device 12 at an appropriately low value. If, on the other hand, control circuitry 42 recognizes from the processing operations of block 202 that device 10 is a larger device with a larger maximum wireless power capability, control circuitry can set the maximum wireless power transmission limit to a higher value to help reduce charging time. The location of the center point RXCP of coil 14 may be used to determine which of coils 36 should be used in transmitting wireless power to device 10. For example, control circuitry 42 may use the coil 36 that is closest and therefore best coupled to coil 14 to perform wireless charging. Configurations in which a set of multiple coils 36 (e.g., those coils 36 that are overlapped by coil 14 such as the three coils 36 that are overlapped by coil 14 in FIG. 7) are activated at the same time based on processed inductance information may also be used. If desired, some of coils 36 may be deactivated based on measured inductance information (e.g., those coils 36 that do not exhibit inductance increases due to overlap with coil 14 may be decoupled from inverter 70 and thereby deactivated during wireless power transmission operations with device 12). As these examples demonstrate, actions can be taken based on measured inductance information (e.g., wireless power can be transmitted based on this information and/or other wireless power transmission adjustments may be made, etc.).

If desired, information on the orientation of device 10 (e.g., angular orientation A of FIG. 5) may be used in determining which coil(s) 36 to use in supplying power, may be used to coordinate the display of information on displays in multiple adjacent devices 10 (e.g., so that an icon or other visual item is displayed with the same upright orientation as that visual item is moved across each of several differently oriented devices 10 on charging surface 60), and/or may be used in performing other operations in system 8.

Eddy currents may be induced in foreign objects such as coins that are present on the coil array. These eddy currents have the potential to undesirably heat the foreign objects. To avoid undesired heating, device 12 can automatically detect when a metal coin or other foreign object is present on the coil array (e.g., under coil 14). Device 12 may, for example, detect the presence of a foreign object by comparing the measured inductances of coils 36 to predetermined valid sets of coil inductances associated with coils 36 in the presence of device 10 and in the absence of any foreign objects. During characterization operations, a computer-controlled positioner or other positioner may move a power receiving device such as device 10 across the surface of the coil array while device 12 gathers inductance measurements from each of the coils. These characterization operations may produce a set of known valid sets of inductance values (e.g., sets of inductance values that are known to arise when device 10 is present on the coil array in the absence of any foreign objects). Unless device 12 detects a valid set of inductance values, device 12 can prevent wireless power transmission operations. In this way, device 12 can transit wireless power only when coil 14 is overlapping the coil array in the absence of foreign objects.

Figure 9:
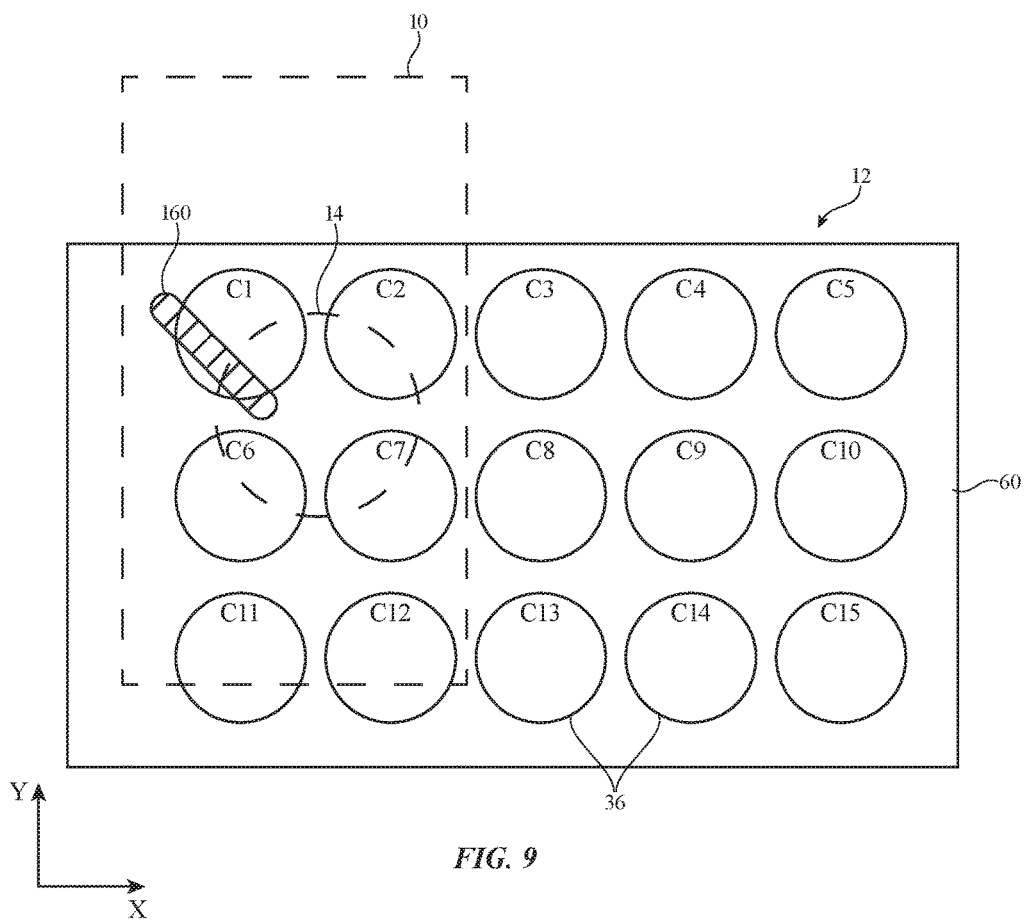
FIG. 9 is a top view of an illustrative wireless power transmitting device on which a receiving device and a foreign object that is overlapped by a receiving coil in the receiving device are present overlapping coils in a coil array in the wireless power transmitting device in accordance with an embodiment.

FIG. 9 is a top view of an illustrative wireless power transmitting device. In the example of FIG. 9, receiving device 10 with coil 14 is overlapping some of coils 36 in the coil array (e.g., coils C1, C2, C6 and C7). Foreign object 160 is also present in the vicinity of coil 14. In particular, foreign object 160 is present on coil C1. Because object 160 overlaps coil C1, object 160 perturbs the inductance of coil C1. As a result, no valid set of coil inductances will be measured. Valid sets of coil inductances will also not be measured in scenarios in which only a foreign object overlaps the coil array (and device 10 is not present), because only coil 14 in device 10 will alter the inductances of coils 36 appropriately to match a valid set of coil inductances.

Figure 10:
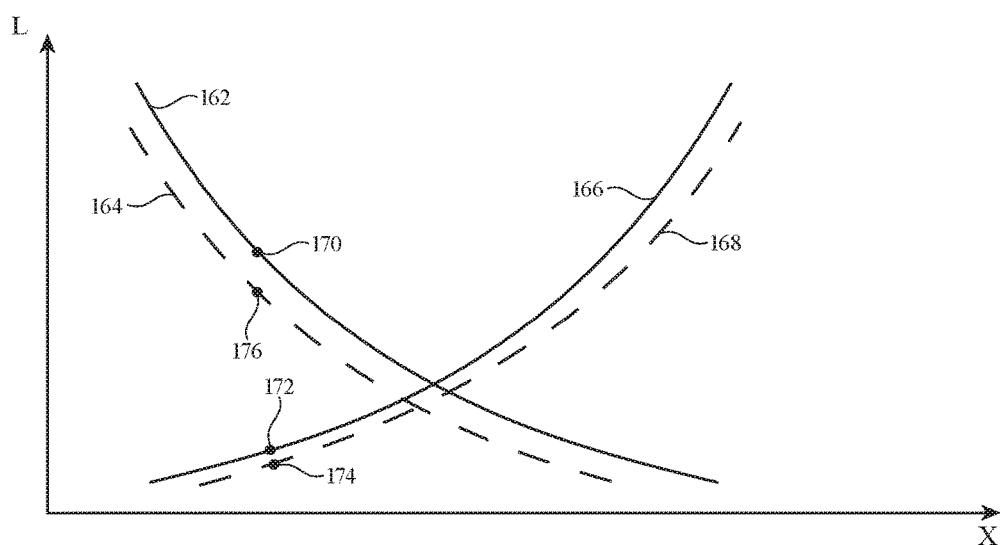
FIG. 10 is a graph showing how inductances for coils in a coil array vary in the presence of a wireless power receiving device coil at various locations relative to the coils and are perturbed due to the presence of foreign objects overlapping the coils in accordance with an embodiment.

FIG. 10 is a graph showing how coil inductances (L) for coils 36 vary as a function of the position (in dimension X) of coil 14. Curves 162 and 166 show how inductances L of coil C1 and C2 vary respectively as a function of the position of coil 14 in the absence of foreign object 160. When coil 14 is aligned with coil C1, inductance L of coil C1 will increase, as shown by the rising value of curve 162 at decreasing values of X. When coil 14 is aligned with coil C2, inductance L of coil C2 will increase, as shown by the rising value of curve 166 at increasing values of X. At intermediate locations, the measured inductances of coils C1 and C2 will have intermediate values.

Curves 164 and 168 correspond to the respective measured inductance values L for coils C1 and C2 in the presence of foreign object 160. Due to the presence of foreign object 160, the expected valid values of inductance L for coils C1 and C2 will be perturbed. For example, the expected inductances of coil C1 at each position of coil 14 will change from that of curve 162 to that of curve 164 and the expected inductances of coil C2 at each position of coil 14 will change from that of curve 166 to that of curve 168.

As a result of the perturbations of the coil inductances due to the presence of foreign object 160, device 12 can detect whether foreign objects are present even when coil 14 overlaps a foreign object. Known valid inductance values (e.g., curves 162 and 166) can be stored in device 12. When device 12 is preparing to transmit wireless power, the inductances of coils 36 can be measured and compared to the valid sets of coil inductances. A match will indicate that device 10 is present and that no foreign object is present, so charging can proceed.

Consider, as an example, a scenario in which the measured inductance of coil C1 is given by inductance 170 of FIG. 10 and in which the measured inductance of coil C1 is given by inductance 172 of FIG. 10. Because these inductance measurements fall on valid inductance curves 162 and 166, device 12 can conclude that foreign object 160 is not overlapping coil 14 (e.g., object 160 is not located between coil 14 and coil C1 or is not otherwise present at a location that would perturb the measured inductance values). If, however, foreign object 160 is present at a location that overlaps coil C1 and coil 14, the values of inductance measured at coils C1 and C2 will not match any valid set of inductances for coils C1 and C2. In particular, as the example of FIG. 10 demonstrates, the presence of object 160 will cause the inductance of coil C1 to drop significantly to the inductance of point 176, whereas the inductance of coil C2 will vary slightly (e.g., to the inductance of point 174 as opposed to the expected value of point 172). The set of measured inductances of coil C1 and C2 in this example (points 176 and 174) do not match any valid set of inductances on curves 162 and 166, so device 12 can conclude that foreign object 160 is present and can take suitable action (e.g., power transmission operations can be blocked).

Figure 11:
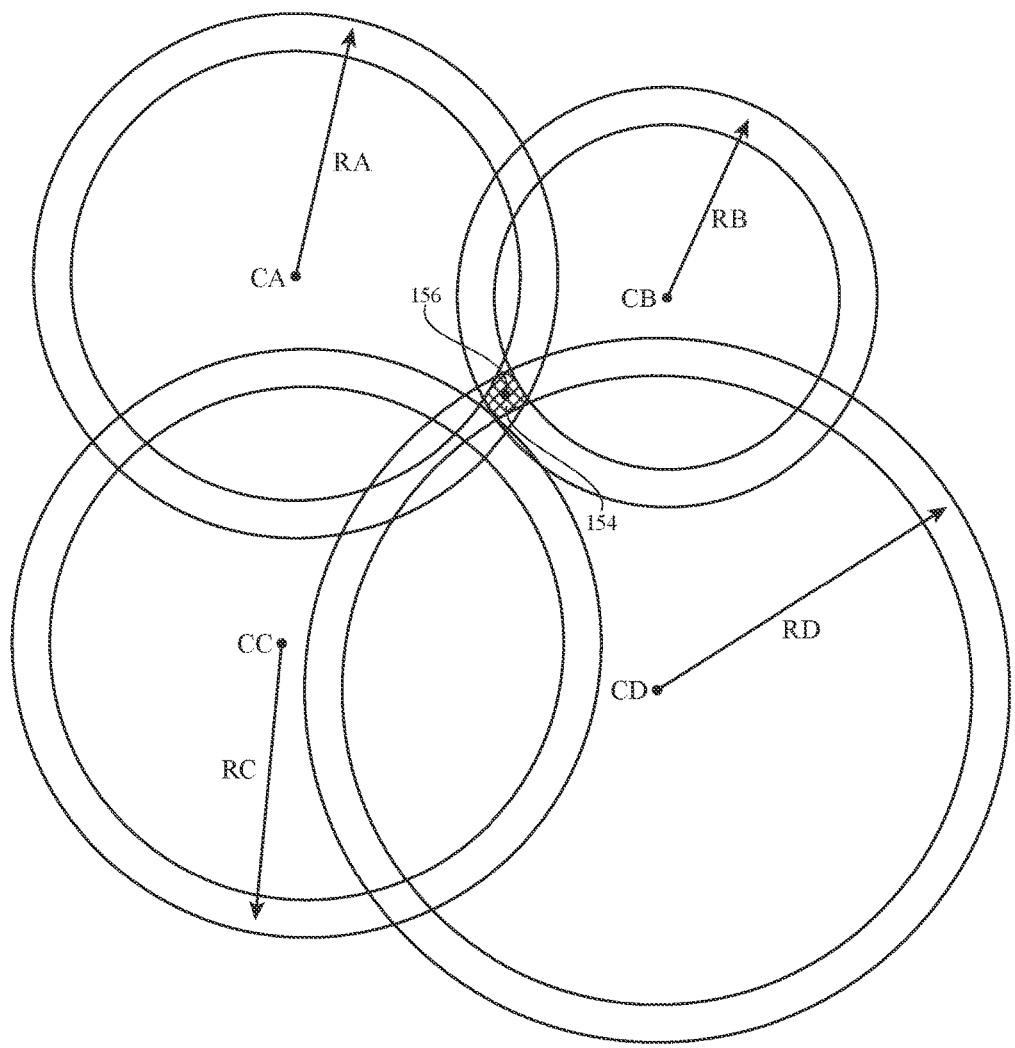
FIG. 11 is a diagram showing how inductance measurements can be used to locate a wireless power receiving device coil on a wireless power transmitting device coil array in the absence of a foreign object in accordance with an embodiment.

The top view diagram of FIG. 11 illustrates how non-linear interpolation techniques may be used to ascertain the location of center point 156 of coil 14. In the example of FIG. 11, the measured inductances of four coils has been used to establish estimated distances (radiuses) from respective coil center points CA, CB, CC, and CD to the center of coil 14. Each inductance measurement has some measurement uncertainty and there is some measurement tolerance allowed when matching measured coil inductances to valid sets of coil inductances, so each radius in FIG. 11 is represented by a band of possible distances (e.g., a circular ring of finite thickness). Overlap area 154 between each ring represents the area in which the center point of coil 14 may be located. Device 12 takes the center of this area (point 156) as the center of coil 14.

In the presence of a foreign object, the set of measured inductances of the four coils will not match any valid set of inductances for the four coils. The foreign object may, as an example, overlap the lower right coil, causing the radius RD' that is calculated from the measured inductance of the lower right coil to be perturbed. In this situation, the bands of possible radiuses RA, RB, RC, and RD' established from the measured inductances of the coils will not overlap as expected. This lack of overlap is indicative that the set of measured inductances do not correspond to any predetermined valid set of coil inductances. Because there is no match between the set of measured inductances and a set of valid inductances, device 12 can conclude that a foreign object is present and 12 can block wireless power transmission operations.

Figure 12:
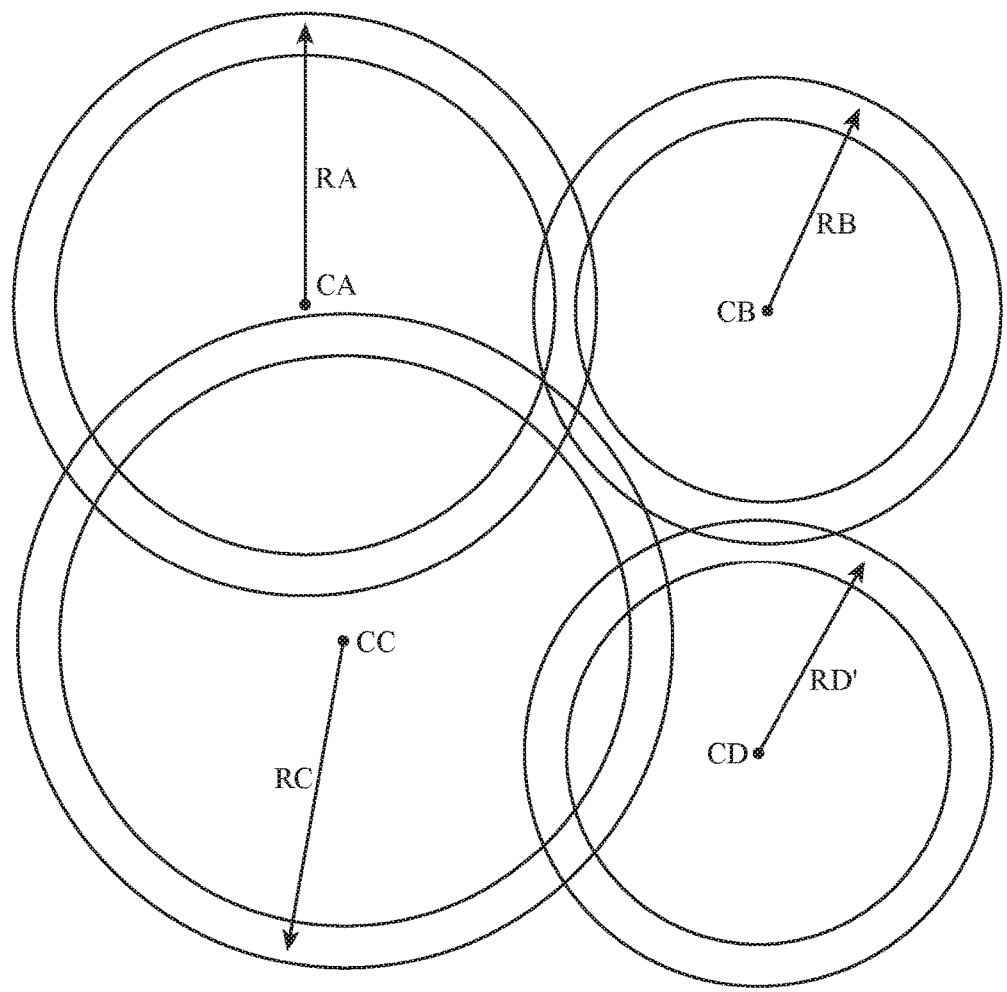
FIG. 12 is a diagram showing how inductance measurements can be used to determine that a foreign object is present in the vicinity of a wireless power receiving device coil so that wireless power transmission operations can be halted or other suitable action taken in accordance with an embodiment.

FIG. 13 is a diagram of an illustrative coil array with fifteen coils C1 . . . C15. In the scenario of FIG. 13, coil 14 of device 10 is overlapping coils C2, C3, C7, and C8. Device 12 measures coil inductances L2, L3, L7, and L8 for coils C2, C3, C7, and C8, respectively, as shown in the last row of the table of FIG. 14. Coils C2, C3, C7, and C8 may be, for example, the only coils in the coil array that have inductances that vary from a nominal coil inductance value. After measuring the inductances, device 12 compares this set of measured coil inductances to the known stored set of valid coil inductances L2, L3, L7, and L8 shown in the first row of the table of FIG. 14. Because the measured and stored values matched (within the measurement tolerances depicted in FIGS. 11 and 12, for example), device 12 can conclude that no foreign object is present on charging surface 60 of FIG. 13.

FIG. 15 is a diagram of the illustrative array of coils 36 of FIG. 13 in a scenario in which foreign object 160 is present at a location that overlaps coil 14. As in the scenario of FIG. 13, coil 14 of device 10 is overlapping coils C2, C3, C7, and C8 in the FIG. 15 configuration. Device 12 measures coil inductances L2, L3, L7, and L8 for coils C2, C3, C7, and C8, respectively, as shown in the last row of the table of FIG. 16. After measuring the inductances, device 12 compares this set of measured coil inductances to all known stored sets of valid coil inductances such as coil inductances L2, L3, L7, and L8 shown in the first row of the table of FIG. 16 (which are the same as the set of valid inductances in the first row of the table of FIG. 14). Because the measured and stored values do not match (within the measurement tolerances depicted in FIGS. 11 and 12, for example), device 12 can conclude that foreign object 160 is present on charging surface 60 of FIG. 15.

Figure 17:
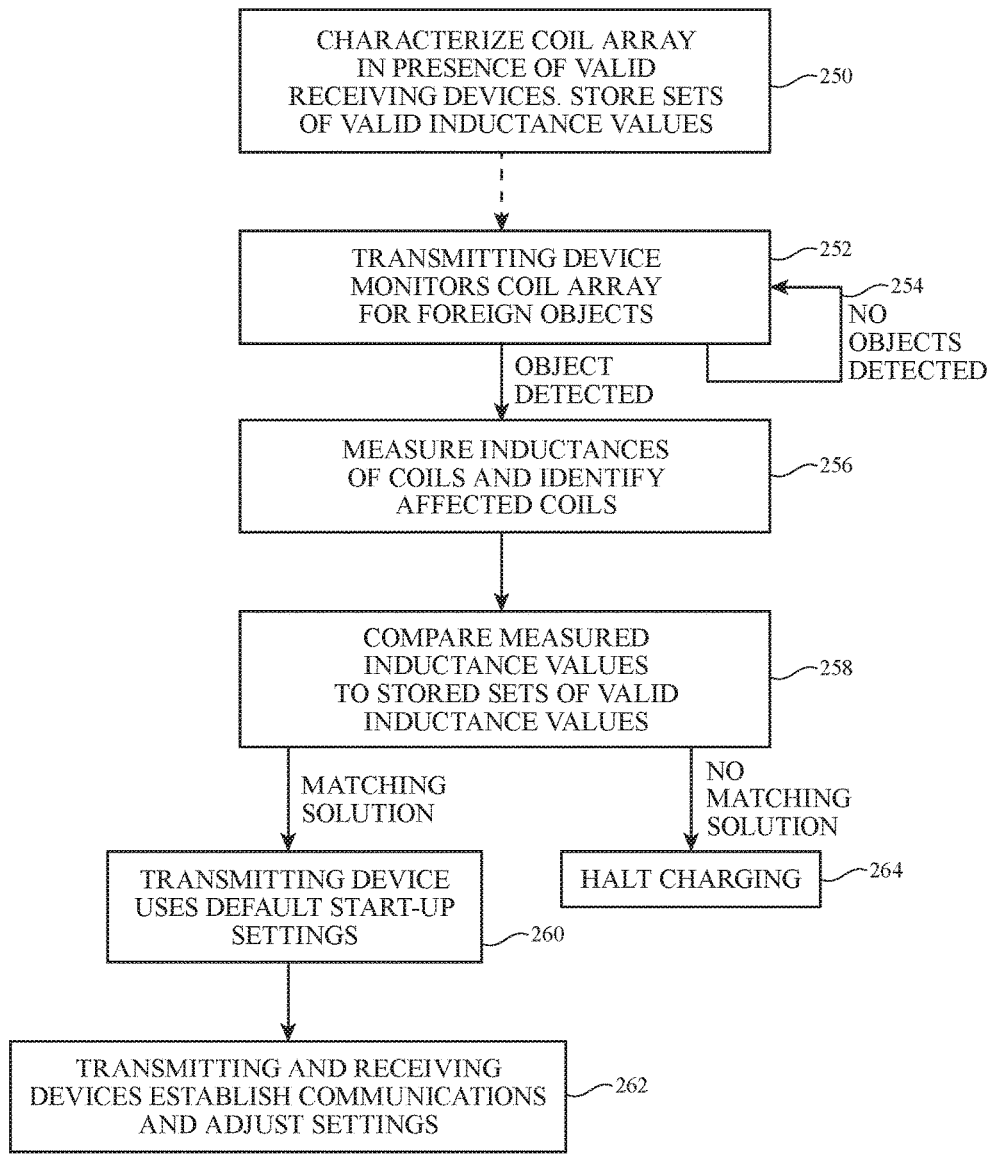
FIG. 17 is a flow chart of illustrative operations involved in operating a wireless power transmission system in accordance with an embodiment.

FIG. 17 is a flow chart of illustrative operations involved in operating wireless power transmission system 8.

During the operations of block 250 (e.g., in a factory or other calibration environment), device 12 (or a representative device of similar or identical construction) is characterized. During characterization measurements, the inductances of coils 36 are measured while placing device 10 and coil 14 (or a representative device and/or coil of similar or identical construction) at various locations across the surface of the coil array of device 12 (e.g., a grid of closely spaced locations covering all of the coil array or a representative subarea of the coil array). In this way, all of the possible valid combinations of measured inductances for coils 36 can be measured and each of these valid sets of inductances can be stored in storage in device 12.

During normal operation (e.g., the operations of block 252), a user places device 10 on charging surface 60 of device 12. Foreign object 160 may or may not be present at a location that overlaps coil 14 or other portion of the coil array. A foreign object detection sensor (e.g., a measurement circuit such as measurement circuit 104 or other suitable impedance measurement circuitry coupled to coils 36, a separate foreign object detection sensor, and/or other object detection circuitry) is used by control circuitry 42 to monitor the coil array of device 12 for the presence of objects. So long as no objects are detected (e.g., the measured inductances and/or other electrical attributes of coils 36 remain constant), monitoring can continue, as illustrated by line 254. If an object is detected (e.g., if circuitry 42 detects an increase in the inductance of one or more of coils 36, etc.), processing may continue to the operations of block 256.

During block 256, control circuitry 42 uses measurement circuitry 102 to measure the inductance of coils 36 (e.g., all of coils 36 or a subset of coils adjacent to the location of the detected object, etc.). Within the measured inductances, a set of inductances with values that differ from the nominal inductance values of coils 36 can be identified (see, e.g., the measured inductances in the tables of FIGS. 14 and 16). These inductance values are potentially indicative of the presence of device 10 and are accordingly analyzed by device 12.

During the operations of block 258, the set of inductance values measured at block 256 (e.g., the inductances that deviate from the nominal coil inductance) is compared to the sets of valid inductances stored in device 12 during the characterization operations of block 250. The stored valid sets of inductances can be stored in a look-up table or may be stored in the form of equations that dynamically compute valid inductance sets to conserve storage space. The set of measured inductance values that is compared during the operations of block 258 may include only those measured inductance values that differ from a nominal coil inductance value (e.g., inductances that appear to be associated with an overlapping coil in a power receiving device). This may help to reduce the amount of processing involved in comparing measured inductances to sets of valid inductances.

The results of the comparison operations of block 258 are used by control circuitry 42 to control the transmission of wireless power to device 10.

If a matching set of valid inductances is identified, device 12 can conclude that device 10 and coil 14 are present and that no foreign objects are present. Non-linear interpolation operations may be used to identify the center of coil 14 and suitable wireless power transmission operations may be performed (block 260). Initially, as an example, device 12 may transmit power using default settings to ensure that device 10 receives power sufficient for operating its communications circuitry. This allows device 10 and device 12 to establish a communications link and allows devices 10 and 12 to establish appropriate operating settings for device 12 and device 10 based on the measured location of coil 14 (block 262). A coil or multiple coils 36 in the coil array may be selected based at least partly on the measured inductance values. For example, the coil(s) 36 selected for wireless power transmission can be identified by determining the center of coil 14 using non-linear interpolation techniques or other coil location measurement techniques (e.g., techniques that use the measured inductance values of coils 36).

In response to determining that the measured set of inductances does not match any valid set of coil inductances, device 12 can halt wireless power transmission or take other appropriate action (block 264). For example, in addition to or instead of preventing device 12 from transmitting wireless power to device 10, device 12 may alert a user of device 12 and device 10 that a foreign object is present (e.g., using a light-emitting device, an audio alert device, a haptic alert device, or other device on device 10 and/or device 12, using wireless notifications, using notifications displayed on a display in device 10, and/or using other alert mechanisms).

The foregoing is illustrative and various modifications can be made to the described embodiments. The foregoing embodiments may be implemented individually or in any combination.

What is claimed is:

1. A wireless power transmitting device configured to transmit wireless power signals to a wireless power receiving coil in a wireless power receiving device, comprising:
   an array of wireless power transmitting coils;
   inverter circuitry coupled to the array of wireless power transmitting coils;
   impulse response measurement circuitry coupled to the array of wireless power transmitting coils; and
   control circuitry configured to:
      store valid sets of coil inductances for the array, wherein each valid set of coil inductances corresponds to inductance values for the wireless power transmitting coils in the array that occur when the wireless power receiving device is present on the charging surface in the absence of foreign objects;
      measure inductance values for at least some of the wireless power transmitting coils with the impulse response measurement circuitry; and
      compare the measured inductance values to the valid sets of coil inductances associated with the array of wireless power transmitting coils to determine whether the wireless power receiving device is present on the array in the absence of foreign objects.

2. The wireless power transmitting device of claim 1 wherein the control circuitry determines whether foreign objects overlap the wireless power receiving coil by comparing the measured inductance values to the valid sets of coil inductances and wherein the control circuitry is further configured to:
   control the transmission of the wireless power signals with the inverter circuitry and the array of wireless power transmitting coils based on whether any foreign objects are determined to be overlapping the wireless power receiving coil by comparing the measured inductance values to the valid sets of coil inductances.

3. The wireless power transmitting device of claim 2 wherein the control circuitry is configured to:
   transmit the wireless power signals in response to determining that no foreign objects overlap the wireless power receiving coil; and block transmission of the wireless power signals in response to detecting that a foreign object overlaps the wireless power receiving coil.

4. The wireless power transmitting device of claim 3 wherein the control circuitry is configured to measure the inductance values for the wireless power transmitting coils by applying impulses to the wireless power transmitting coils with the inverter circuitry and measuring corresponding impulse responses with the impulse response measurement circuitry.

5. The wireless power transmitting device of claim 4 wherein the control circuitry is further configured to control the transmission of the wireless power signals by selecting a given coil in the array of wireless power transmitting coils to transmit the wireless power signals based at least partly on the measured inductance values.

6. A wireless power transmitting device configured to transmit wireless power signals to a wireless power receiving device, comprising:
an array of wireless power transmitting coils;
inverter circuitry coupled to the array of wireless power transmitting coils;
inductance measurement circuitry coupled to the array of wireless power transmitting coils; and
control circuitry configured to:
measure inductance values for at least some of the wireless power transmitting coils by applying impulses to the wireless power transmitting coils with the inverter circuitry and measuring corresponding impulse responses with the inductance measurement circuitry; and
determine whether foreign objects are present on the array of wireless power transmitting coils at least partly by comparing the measured inductance values to coil inductance values associated with presence of the wireless power receiving device on the array of wireless power transmitting coils in absence of any foreign objects.

7. The wireless power transmitting device of claim 6 wherein the control circuitry is configured to measure an inductance value for each of the wireless power transmitting coils and is configured to use the measured inductance values in determining whether any foreign objects overlap a wireless power receiving coil in the wireless power receiving device.

8. The wireless power transmitting device of claim 7 wherein the control circuitry is configured to:
store sets of the coil inductance values that are associated with the presence of the wireless power receiving device on the array of wireless power transmitting coils in the absence of any foreign objects.

9. The wireless power transmitting device of claim 6 wherein the inductance measurement circuitry comprises impulse response measurement circuitry coupled to the array of wireless power transmitting coils.

10. The wireless power transmitting device of claim 6 wherein the control circuitry is further configured to control the transmission of the wireless power signals by selecting a given coil in the array of wireless power transmitting coils to transmit the wireless power signals based at least partly on the measured inductance values.

11. The wireless power transmitting device of claim 6 wherein the control circuitry is configured to block transmission of the wireless power signals in response to determining that a foreign object is present.

12. The wireless power transmitting device of claim 6 wherein the control circuitry is configured to transmit the wireless power signals in response to determining that no foreign objects are present by comparing the measured inductance values to the coil inductance values.

13. A wireless power transmitting device configured to transmit wireless power signals to a wireless power receiving device, comprising:
an array of wireless power transmitting coils, wherein the wireless power transmitting coils have a nominal inductance value in absence of foreign objects and the wireless power receiving device;
wireless power transmitter circuitry coupled to the array of wireless power transmitting coils;
inductance measurement circuitry coupled to the array of wireless power transmitting coils; and
control circuitry configured to:
measure inductance values for at least some of the wireless power transmitting coils with the inductance measurement circuitry; and
compare the measured inductance values to sets of coil inductance values for the array of wireless power transmitting coils that are associated with presence of the wireless power receiving device on the array of wireless power transmitting coils in absence of foreign objects, wherein each one of the coil inductance values in each set is different than the nominal inductance value.

14. The wireless power transmitting device of claim 13 wherein the control circuitry is configured to block transmission of the wireless power signals in response to determining that the measured inductance values do not match any of the sets of coil inductance values.

15. The wireless power transmitting device of claim 14 wherein the control circuitry is configured to transmit the wireless power signals in response to determining that the measured inductance values match one of the sets of coil inductance values.

16. The wireless power transmitting device of claim 15 wherein the control circuitry is configured to store the sets of the coil inductance values for comparing to measured inductance values.

17. The wireless power transmitting device of claim 16 wherein the inductance measurement circuitry comprises impulse response measurement circuitry.

18. The wireless power transmitting device of claim 15 wherein the control circuitry is further configured to control the transmission of the wireless power signals by selecting a given coil in the array of wireless power transmitting coils to transmit the wireless power signals based at least partly on the measured inductance values.

19. The wireless power transmitting device of claim 13 wherein the control circuitry is configured to determine whether the wireless power receiving device is present on the array in absence of foreign objects by comparing only those measured inductance values that differ from the nominal coil inductance value to the sets of coil inductance values.

* * * * *